United States Patent

[11] 3,537,554

| [72] | Inventors | J. Russell Elmore<br>New Hartford;<br>John H. Cowles, Forestville, Connecticut |
|---|---|---|
| [21] | Appl. No. | 779,460 |
| [22] | Filed | Nov. 27, 1968 |
| [45] | Patented | Nov. 3, 1970 |
| [73] | Assignee | The Torrington Company<br>Torrington, Connecticut<br>a corporation of Maine |

[54] FINGER-TYPE CAGE FOR OVERRUNNING CLUTCH
20 Claims, 14 Drawing Figs.

[52] U.S. Cl. ..................................................... 192/45
[51] Int. Cl. ....................................................... F16d 15/00,
F16d 41/06
[50] Field of Search ........................................... 192/45

[56] References Cited
UNITED STATES PATENTS

| 549,377 | 11/1895 | Ljungstrom ................... | 192/45X |
| 3,294,208 | 12/1966 | Anderson ..................... | 192/45X |

Primary Examiner—Allan D. Herrmann
Attorneys—Carl R. Horten, David W. Tibbott and Frank S. Troidl ABSTRACT: This disclosure relates to a cage for an overrunning clutch of the type wherein rollers are positioned between a cylindrical race surface and a cam surface and wherein a cage is provided for retaining the rollers in alignment with the cam surfaces and in spring loaded wedging engagement therewith. The cage of this disclosure is a finger-type cage and consists simply of an end ring having a plurality of circumferentially spaced, axially extending fingers. The cage may be molded of a suitable material, including plastic, or may be stamped from sheet metal. The fingers are spaced apart to define pockets therebetween and the end ring has stop means thereon for engagement with a clutch member to position the cage in a position wherein each finger is resiliently deflected by the associated roller when the roller is in operative engagement with its associated cam surface so that the normally straight fingers of the cage function as spring elements in the assembled clutch. Because the cage is disposed at one end of the rollers, one cage dimension may be utilized with a plurality of different roller lengths.

Patented Nov. 3, 1970
3,537,554
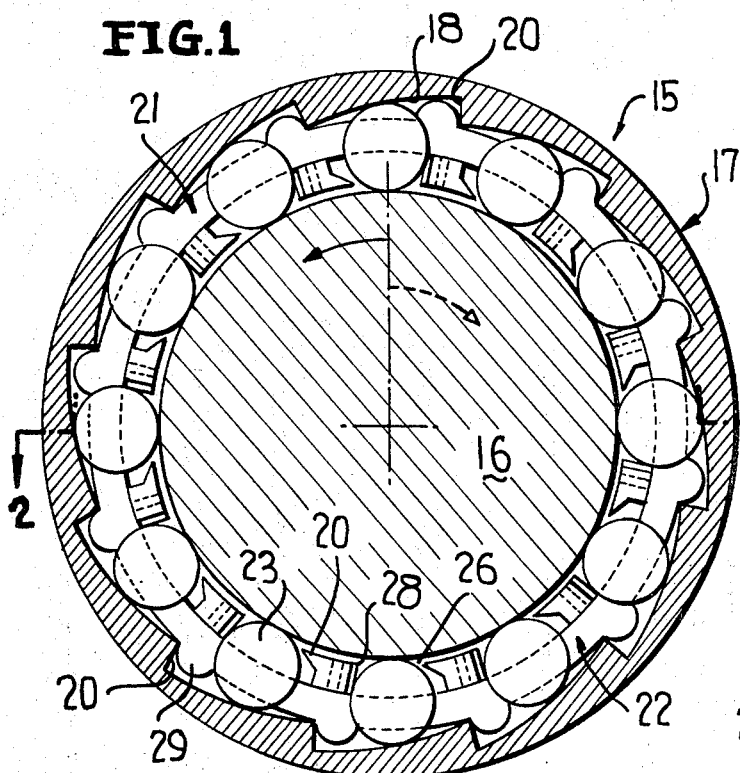
FIG. 1
FIG. 2
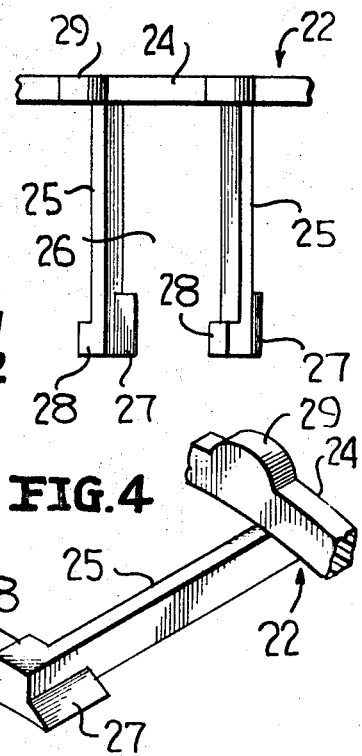
FIG. 3
FIG. 4
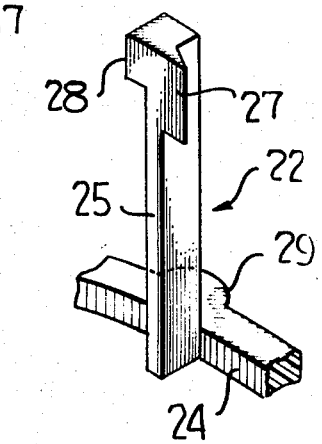
FIG. 5
INVENTORS
J RUSSELL ELMORE
& JOHN H. COWLES
BY Mason, Porter, Diller & Brown
ATTORNEYS Patented Nov. 3, 1970

INVENTORS
J. RUSSELL ELMORE
& JOHN H. COWLES

BY
Mason, Porter, Diller & Brown
ATTORNEYS 3,537,554

FINGER-TYPE CAGE FOR OVERRUNNING CLUTCH

This invention relates in general to new and useful improvements in overrunning clutches, and more particularly to a finger-type cage for overrunning clutches.

In an overrunning clutch of the type utilizing the rollers as the clutching elements, the rollers are retained relative to a clutch member in alignment with cam surfaces of the clutch member. The rollers are disposed between a cylindrical race surface and individual cam surfaces for wedging engagement therebetween and must be resiliently urged independently into slight wedging engagement at all times in order to provide for effective operation of the clutch. Because of this constant spring action on the rollers, and because of the minuteness of the size of the clutch assemblies, difficulties have been experienced in the past in providing a cage having adequate and lasting spring elements.

In view of the foregoing, it is a primary object of this invention to provide a simple cage particularly adapted for use with overrunning clutches and wherein the roller retaining pockets of the cage are formed by fingers which are resiliently bendable under circumferential loads whereby the fingers serve the dual function of defining the pockets and resiliently urging associated rollers into engagement with cam surfaces of a clutch member.

Another feature of this invention is to provide a novel cage for overrunning clutches wherein the cage is formed simply of an end ring having axially extending fingers projecting therefrom in circumferentially spaced relation, the fingers normally being disposed at right angles to the end ring and having sufficient inherent resiliency to function as springs to urge associated rollers into engagement with cam surfaces of a clutch member, the fingers being of sufficient size and strength so as to be long lasting under load.

A further object of this invention is to provide a novel finger-type cage for overrunning clutches, the cage being formed of an end ring having axially extending fingers projecting therefrom, the fingers defining therebetween circumferentially spaced pockets, and the cage having receivable therein end portion of rollers whereby the cage is not restricted in use to any particular length of roller, one cage being useable in conjunction with rollers of varying lengths.

A further feature of this invention is to provide a novel finger-type cage and roller assembly for overrunning clutches wherein two cages which are mirror identical with one another may be disposed in axially spaced aligned relations and having disposed therebetween a plurality of rollers, the relationship between the rollers and the cages being such that the pair of cages may selectively engage opposite ends of very long rollers, or the rollers may be disposed in two rows with one cage retaining the rollers of an associated row of rollers.

With the above and other objects in view that will hereinafter appear, the nature of the invention will be more clearly understood by reference to the following detailed description, the appended claims and the several views illustrated in the accompanying drawings:

IN THE DRAWINGS

FIG. 1 is a transverse sectional view taken through an overrunning clutch incorporating a finger-type cage formed in accordance with this invention.

FIG. 2 is a longitudinal sectional view taken generally along the line 2-2 of FIG. 1 and shows specifically the relationship of rollers with respect to the fingers of the cage when the rollers are in their operative positions.

FIG. 3 is a fragmentary elevational view of the cage prior to the assembling of rollers therein.

FIG. 4 is a fragmentary perspective view showing the specific relationship between one of the cage fingers and the end ring thereof.

FIG. 5 is a rotated perspective view of the one finger and fragmentary portion of the end ring of FIG. 4.

Figure 6:
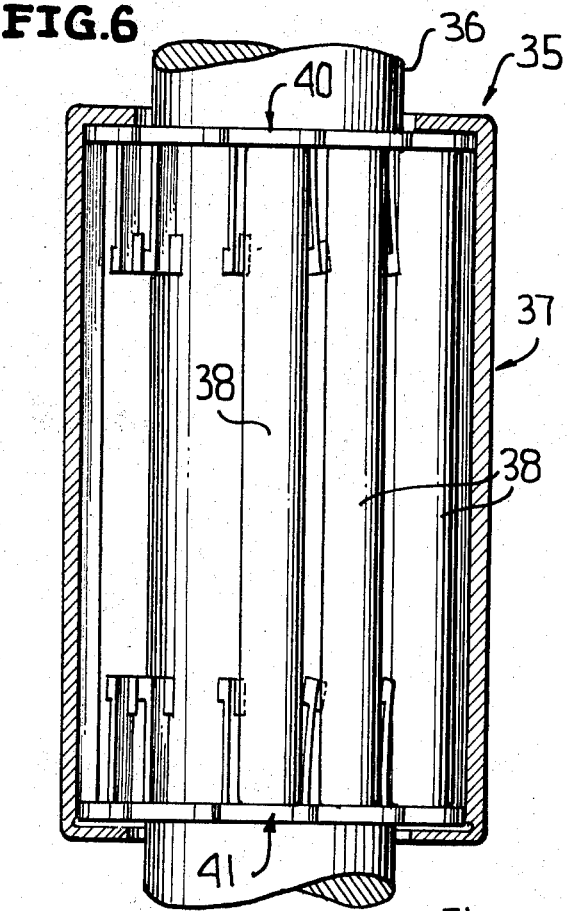
FIG. 6 is a longitudinal sectional view similar to FIG. 2 and shows a clutch having very long rollers supported by a pair of mirror image cages.

Referring now to the drawings in detail, it will be seen that there is illustrated in FIGS. 1 and 2 an overrunning roller clutch assembly which is generally referred to by the numeral 15. The clutch assembly 15 includes a shaft 16 and an outer clutch member 17. It is to be understood that the outer clutch member 17 is to be suitably mounted within a machine element and that with the illustrated clutch 15, the shaft 16 is to be locked with the outer clutch member 17 and the shaft 16 rotates in a counterclockwise direction, with the shaft 16 being free to rotate independently of the clutch member 17 in a clockwise direction.

The internal surface of the clutch member 17 is configurated to define a plurality of circumferentially spaced, axially extending cam surfaces 18. Each cam surface 18 slopes radially inwardly in a counterclockwise direction and is provided at the clockwise end thereof with a stop shoulder 20.

There is disposed between the clutch member 17 and the shaft 16 a cage and roller assembly which is generally identified by the numeral 21. The cage and roller assembly 21 includes a finger-type cage 22 and a plurality of identical rollers 23, there being one roller 23 for each of the cam surfaces 18. The cage 22 serves to retain the rollers 23 in assembled relation with respect to the clutch member 17 independent of the shaft 16 and, in the operative assembly, resiliently urges the rollers into wedging engagement between the cam surfaces 18 and the shaft 16.

At this time it is pointed out that the overrunning clutch assembly 15 is basically conventional with the exception of the cage 22 and the relationship thereof relative to the rollers 23, which cage construction and the relationship are the novel features of this invention.

The finger-type cage 22 is of a very simple construction and may be economically formed. Basically, the cage 22 includes an end ring 24 having extending axially therefrom a plurality of circumferentially spaced fingers 25. As is best shown in FIG. 3, circumferentially adjacent fingers 25 define therebetween a roller receiving pocket 26.

Each finger 25 is provided at the end thereof remote from the end ring 24 with a roller supporting seat 27, the seat 27 projecting into the associated pocket 26 and being of sufficient axial extent to provide an adequate support for a roller 23 to retain the roller in assembled relation with respect to the clutch member 17. It is to be noted that the seat 27 preferably has a radially inwardly sloping roller engageable surface.

Each finger 25 is also provided with a projecting lug 28 at the end thereof remote from the end ring 24. As is best shown in FIG. 3, each lug 28 also projects into an adjacent roller receiving pocket 26. Each lug 28 is generally in opposed relation to the roller supporting seat 27 of the next adjacent finger 25.

At this time it is pointed out that the spacing between each projecting lug 28 and the cooperating roller supporting seat 27 is less than the diameter of one of the rollers 23. Thus, while the rollers 23 are free to move radially outwardly relative to the cage 22, they are restrained against radial inward movement by the cage 22. Thus, when the cage 22, the rollers 23 and the clutch members 17 are assembled as a unit, the rollers 23 are retained as part of that assembly, independently of the positioning of a shaft 16 therein.

The end ring 24 is provided with circumferentially spaced stop members 29 along the outer periphery thereof. The stop members 29 are provided for engagement with the stop shoulders 20 so as to limit the movement of the cage 22 in a clockwise direction relative to the clutch member 17. It is to be understood that although the fingers 25 are initially straight, as is shown in FIGS. 3 and 4, the fingers 25 are formed of a resilient material and therefore, are resiliently bendable when under compressive loads. The relative positions of the fingers 25, the stop members 29 and the stop shoulders 20 are such that when a roller is in operative position within the clutch 15, as is shown in FIG. 1, it is urged in a clockwise direction by engagement with the respective cam surface 18 and urges a clockwise adjacent finger 25 in a clockwise direction. However, since clockwise movement of the cage 22 is restricted by the engagement of the stop members 29 with the stop shoulders 20, it will be seen that a bending of the finger 25 results, as is clearly shown in FIG. 2.

It is to be understood that prior to the positioning of the shaft 16 within the clutch assembly, the rollers 23 are free to move radially inwardly a limited distance, as permitted by the seats 27. At this time, the fingers 25 may be straight or only very slightly bent. However, when the shaft 16 is positioned within the outer clutch member 17, the shaft 16 will force the rollers 23 radially outwardly. Since the rollers 23 engage the cam surfaces 18 when forced outwardly, and due to the slope of the cam surfaces 18, are forced in a clockwise direction, the bending of the fingers 25 occurs at the time the shaft 16 is positioned. It will be readily apparent that the bending of the fingers 25 and the spring loading thereof may be very accurately controlled by the position of the stop members 29 on the end ring 24.

From the foregoing description of the clutch 15 and the cage 22, it will be readily apparent that the cage 22 has definite advantages. It is obviously of an extremely simple construction and may be readily formed at a very low cost. It will also be apparent that the fingers 25 serve both to retain the rollers 23 in their assembled relation and to resiliently load the rollers 23 to hold them in the necessary wedging engagement with the cam surfaces 18. Inasmuch as the fingers 25 may be of a relatively heavy construction, it will be readily apparent that the constant flexure of the fingers 25 during the operation of the clutch 15 will not result in an undue short life of the fingers and the resultant breakage thereof. Therefore, not only will the cage 23 provide all of the desired functional characteristics of a cage for an overrunning clutch, but also it is of a construction wherein it may be economically formed and at the same time have a longer than usual expected life.

A further and perhaps not readily apparent feature of the cage 22 is that unlike previously provided cages for overrunning clutches of the type to which this invention relates, which provided pockets of definite lengths, the pockets 26 do not have a definite length relationship to the length of the roller 23. In FIG. 2 there is illustrated the preferred relationship between the rollers 23 and the cage 22 wherein the rollers 23 are engaged by the seats 27 generally along their midpoints. However, it will be readily apparent that the same cage 22 could be utilized in conjunction with rollers which are both shorter and longer than the rollers 23. Therefore, the single cage 22 may be utilized in the formation of overrunning clutches of different axial extents.

Referring now to FIG. 2 once again, it is to be noted that with the exception of the shaft 16, the clutch 15 may be provided as an assembly. The clutch member 17 is preferably in the form of a cup having an originally formed end flange 30 with an opening 31 therethrough of a size to freely receive the shaft 16. The cage 22 is assembled with the clutch member 17 by inserting the same through the end of the clutch member remote from the flange 30. Thereafter, the second end flange 31 is turned inwardly parallel to the flange 30 so as to confine the cage 22 therein. The rollers 23 may be readily snapped into the cage 22 after the assembling thereof with the clutch member 17.

Reference is now made to FIG. 6 wherein there is illustrated a modified form of overrunning clutch, which clutch is identified by the numeral 35. The clutch 35 is of a similar construction to the clutch 15 and includes a shaft 36 and an outer clutch member 37. The clutch 35 differs from the clutch 15 in that it is of a much greater axial length than the clutch 15. Accordingly, the clutch 35 is provided with rollers 38 which are quite long as compared to the rollers 23. In order that there may be adequate support for the rollers 38, in lieu of the single finger-type cage 22 provided for the clutch 15, the clutch 35 is provided with a pair of finger-type cages 40 and 41.

Assuming the clutch 35 to be of the same size as the clutch 15 except for axial length, it is to be understood that the cage 40 will be identical to the cage 22. On the other hand, the cage 41 will be of a like construction to the cage 22, but will be a mirror image of the cage 22.

It will be readily apparent that the two cages 40, 41 in cooperation with one another, will function to adequately retain the rollers 38 in assembled relation with respect to the clutch member 37 and at the same time, in the operative positions of the rollers 38, will sufficiently resiliently urge the rollers 38 into wedging engagement with the cam surfaces of the clutch member 37.

Figure 7:
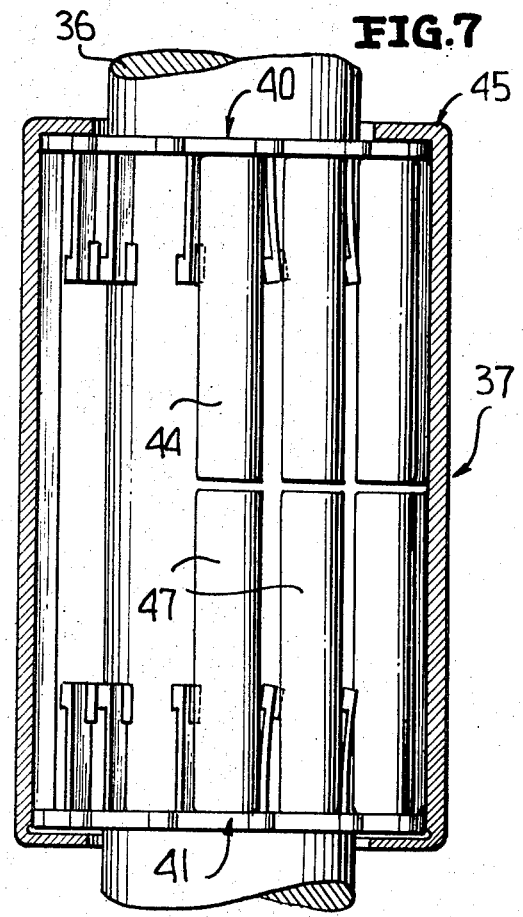
FIG. 7 is a longitudinal sectional view similar to FIG. 2 and shows a clutch wherein there are two rows of rollers supported by a pair of mirror image cages.

Referring now to FIG. 7, it will be seen that there is illustrated another form of overrunning clutch. The overrunning clutch of FIG. 7, which is generally identified by the numeral 45, is very similar to the overrunning clutch 35 of FIG. 6. The only difference between the overrunning clutch 35 and the overrunning clutch 45 is that in lieu of the very long rollers 38 of the clutch 35, the clutch 45 is provided with two sets of shorter rollers 44. The cage 40 supports and positions one row of the rollers 44 while the cage 41 supports and positions the other row of rollers 44.

Although it may be advantageous to mold the finger-type clutch of this invention from a suitable material, such as plastic, it is to be understood that a finger-type clutch embodying the spirit of the invention may also be readily formed from sheet metal. Fragmentary views of such clutches are clearly shown in FIGS. 8 through 11.

Figure 8:
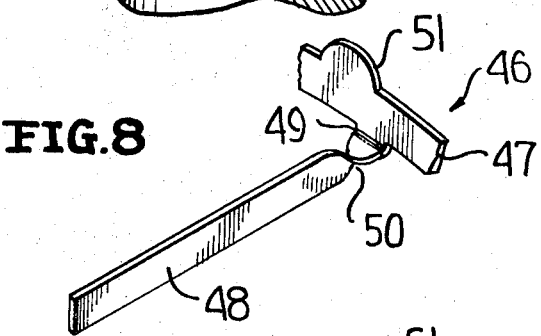
FIGS. 8 through 11 are fragmentary perspective views similar to FIG. 4 showing different modifications of cage constructions wherein the cages are formed of sheet metal.

Referring first to FIG. 8, it will be seen that there is illustrated a sheet metal finger-type clutch which is identified by the numeral 46. The clutch 46 is stamped from a flat sheet of metal and includes an end ring 47 which has extending axially therefrom a plurality of fingers 48 of which only one finger is shown. It is to be noted that the finger 48 is bent at right angles to the plane of the end ring 47 as at 49 so that the end ring 47 may lie in a transverse plane while the finger lies in a radial plane.

In order that the finger 48 may provide a greater surface in opposed relation to an adjacent roller and at the same time to provide for greater resiliency of the finger 48, the finger is twisted about its axis as at 50 through an angle of 90°. The plane of the major portion of the finger 48 is now a radial plane.

It is also to be understood that during the shaping of the end ring 47, such as by a stamping operation, the end ring 47 will be provided with stop members 51 which correspond to the stop members 29. Thus, the cage 41 will have the same cooperating engagement with the clutch member 17 as does the cage 22.

Figure 9:
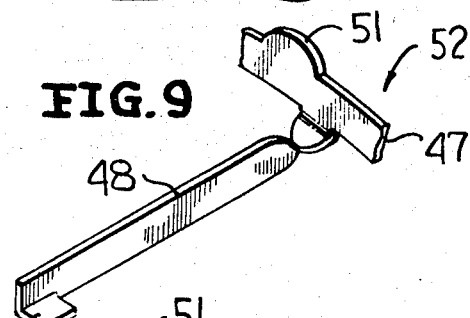

In FIG. 9 there is illustrated a slightly modified form of cage which is identified by the numeral 52. The cage 52 differs from the cage 41 only in that the finger 48 thereof is provided adjacent the free end thereof with a tab which defines a roller supporting seat 53. It is to be noted that tab 53 is bent at right angles to the principal plane of the finger 48 and projects circumferentially therefrom.

Figure 10:
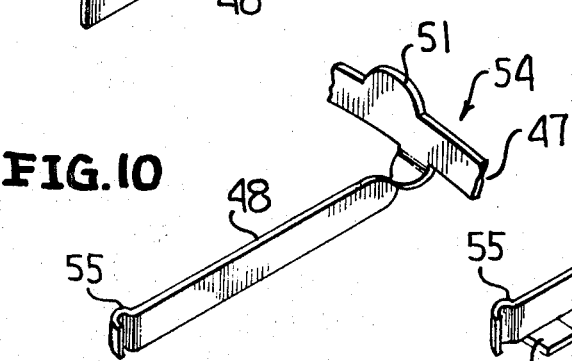

In FIG. 10 there is illustrated another modified form of cage which is identified by the numeral 54. The cage 54 is basically of the same construction as the cage 41 and differs therefrom only in a slight modification to the end of the finger 48 remote from the end ring 47. It is to be noted that the finger 48 of the cage 54 has the extreme end portion thereof reversely bent to a generally U-shaped cross-sectional configuration to define a projecting lug 55. The lug 55 is engageable with an adjacent roller and functions to space the adjacent roller generally from the remainder of the finger 48. Due to the rounded configuration of the lug 55, there is no undesired interlock between the finger 48 and an associated roller.

Figure 11:
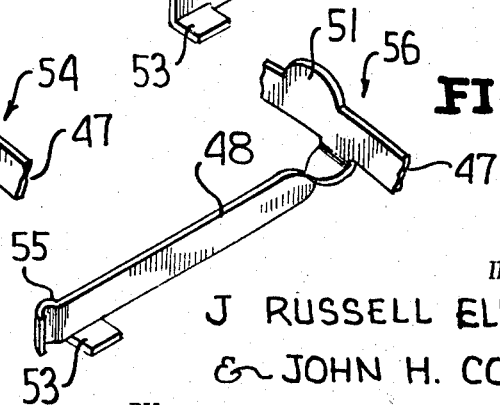

In FIG. 11 there is illustrated still another form of cage which is identified by the numeral 56. The cage 56 is a composite of the cages 52 and 54 in that the finger 48 is provided with both the roller supporting seat 53 and the roller engaging projecting lug 55. It is to be understood that the cooperation of the seats 53 and the lugs 55 will be the same as that described with respect to the seats 27 and the lugs 28.

It will be readily apparent that the cages 46, 52, 54 and 56 may be readily automatically stamped from flat sheet material in a conventional manner. Accordingly, it is not believed to be necessary to describe here the manner in which the sheet metal cages are formed.

Figure 12:
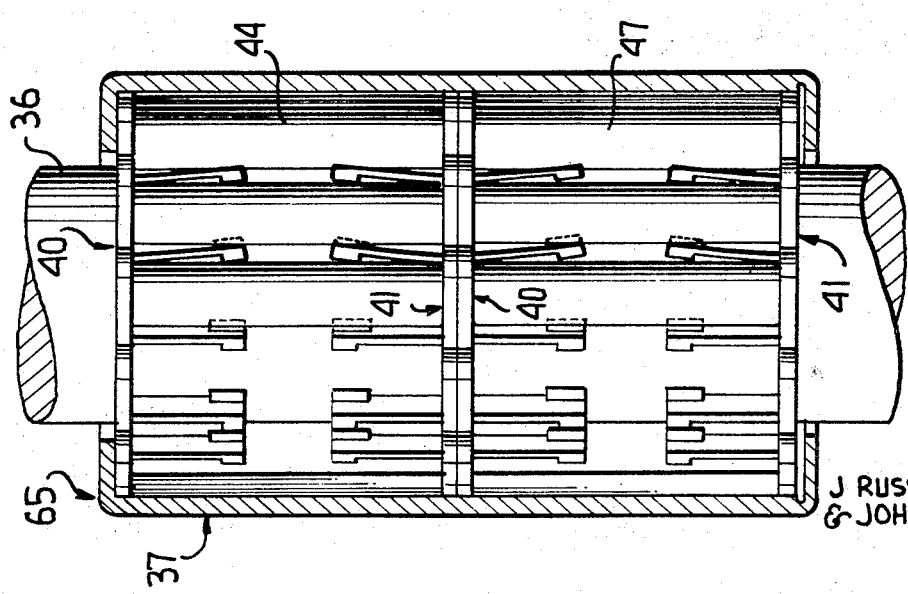

Reference is next made to FIG. 12 wherein there is illustrated another form of overrunning clutch, which clutch is generally identified by the numeral 65. This clutch is very similar to the overrunning clutch 45 of FIG. 7 and differs therefrom primarily in the arrangement of cages for supporting the rollers 44 and 47 thereof. It is to be noted that in the clutch 65, in lieu of the rollers 44 and 47 being supported by cages at the remote ends thereof, there is disposed centrally of the outer clutch member 37 an additional pair of cages 40,41. Although the cages 40,41 in the center of the clutch 65 are in back-to-back relation, it is to be understood that they are independently mounted. Thus, the set of rollers 44 are supported by two mirror image cages 40,41 and the set of rollers 47 are supported by a like set of mirror image cages 40,41.

Figure 13:
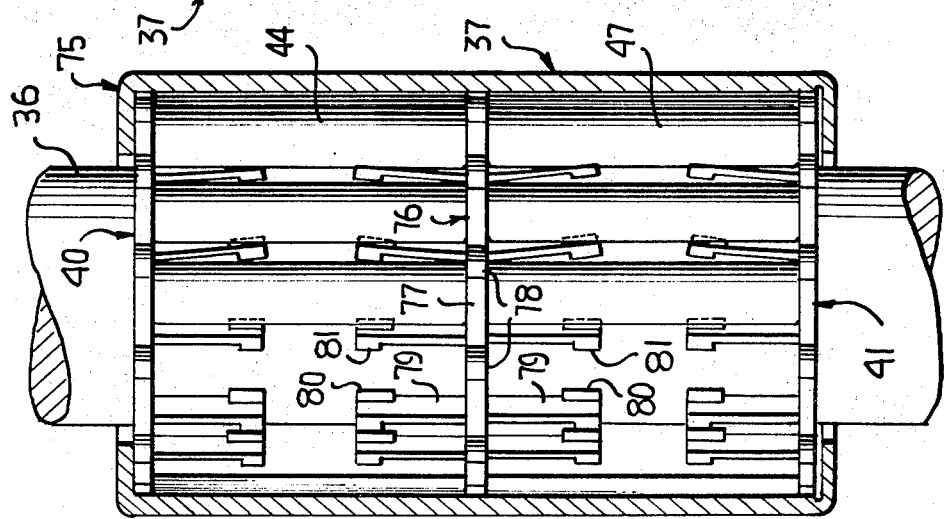

Referring now to FIG. 13 in particular, it will be seen that there is illustrated an overrunning clutch which is generally identified by the numeral 75. The overrunning clutch 75 is of a construction very similar to the overrunning clutch 65 of FIG. 12. The clutch 75 includes two sets of short rollers 44 and 47 with the remote ends of the rollers 44 and 47 being supported by mirror image cages 40,41, respectively. However, in lieu of the opposed ends of the rollers 44, 47 being independently supported by separate cages, it is feasible to provide an intermediate cage, which is generally identified by the numeral 76. The intermediate cage 76 includes a centrally disposed ring 77 having circumferentially spaced stop members 78 projecting radially therefrom for engagement with stop shoulders of the outer clutch member, the stop shoulders corresponding to the stop shoulders 20 of the outer clutch member 17.

The cage 76 has a plurality of circumferentially spaced fingers 79 projecting from opposite faces thereof generally in axial alignment with each other. The fingers 79 correspond to the fingers 75 with each finger 79 being provided remote from the ring 77 with a roller supporting sheet 80 and a roller engaging lug 81.

Figure 14:
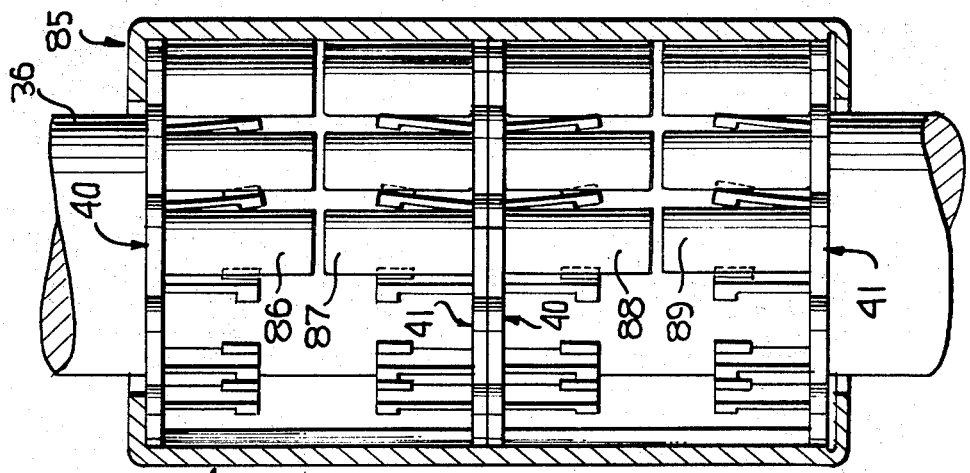
FIGS. 12 through 14 are longitudinal sectional views similar to FIG. 2 and show other clutches having different arrangements of rollers and cages.

Reference is now made to a still further form of overrunning clutch which is illustrated in FIG. 14 and which is generally identified by the numeral 85. It might be said that the clutch 85 constitutes another variation of the clutch 35 of FIG. 6. The clutch 85 includes a shaft 36 and an outer clutch member 37. However, the clutch 85, in lieu of having a single row of elongated rollers, such as the rollers 38 of the clutch 35 or two rows of shorter rollers, such as the rollers 44 and 47 of the clutch 45, is provided with four rows of rollers. The rollers are identified by the numerals 86, 87, 88 and 89 in that order. The rollers 86 and 89 are disposed remote from one another with the rollers 86 being maintained in position by means of a cage 40 and the rollers 89 being maintained in position by means of a mirror image cage 41 in the same manner as are the rollers 44 and 47, respectively of the clutch 45.

The rollers 87 have the ends thereof in opposed relation to the rollers 86 and are positioned by means of a cage 41.

A second cage 40 is disposed in face-to-face engagement with the inner cage 41 and positions and guides the rollers 88, the rollers 88 being in end-to-end relation with respect to the rollers 89. In other words, the clutch 85 is provided with four sets of rollers with each set of rollers being independently positioned by means of a separate cage and there being two pairs of mirror image cages.

At this time it is pointed out that it is feasible for the back-to-back cages 40,41 disposed at the center of the overrunning clutch 85 to be of a one-piece cage construction, such as the cage 76 of FIG. 13.

Although several specific embodiments of cages and overrunning clutch assemblies have been illustrated and described herein, it is to be understood that further minor modifications may be made in the cage construction without departing from the spirit of this invention.

We claim:

1. A finger-type cage for an overrunning clutch, said cage comprising an end ring having a plurality of axially extending fingers defining therebetween roller receiving pockets, said fingers being resiliently bendable under a circumferential load, and stop means on said end ring for engagement with cam surfaces and stop shoulders of a clutch member, said stop means being circumferentially positioned relative to said fingers whereby when said cage becomes an operative part of an overrunning clutch, said fingers will be circumferentially loaded to resiliently hold rollers in engagement with clutch cam surfaces.

2. The cage of claim 1 wherein said fingers are provided with roller supporting seats.

3. The cage of claim 1 wherein said fingers are provided with roller supporting seats remote from said end ring.

4. The cage of claim 1 wherein said fingers are provided with roller supporting seats and generally oppositely facing roller engageable projections.

5. The cage of claim 1 wherein said cage is of a one-piece construction.

6. The cage of claim 1 wherein said cage is of a molded one-piece construction.

7. The cage of claim 1 wherein said cage is of a one-piece sheet metal construction.

8. The cage of claim 1 wherein said cage is formed in one piece from sheet metal with said fingers being folded normal to the plane of said end ring, and each finger is twisted about its axis adjacent to said end ring to have a major portion thereof lying in a radial plane.

9. The cage of claim 8 wherein each finger is reversely folded adjacent the free end thereof to provide a circumferentially extending projection.

10. The cage of claim 1 wherein said cage is part of a cage and roller assembly with there being a roller seated in each of said cage pockets, and said rollers are of a greater axial extent than said fingers and the length of said rollers being independent of the length of said fingers.

11. A cage and roller assembly for an overrunning clutch comprising a pair of opposed cages and a plurality of rollers, said cages being mirror images of one another and each cage comprising an end ring having a plurality of axially extending fingers defining therebetween roller receiving pockets, said fingers being resiliently bendable under a circumferential load, and stop means on said end ring for cooperation with a clutch member having cam surfaces thereon, said stop means being circumferentially positioned relative to said fingers whereby when said cage becomes an operative part of an overrunning clutch, said fingers will be circumferentially loaded to resiliently hold rollers in engagement with clutch cam surfaces, said cages being in axially aligned opposed relation with said rollers being seated in said pockets and extending between said cages.

12. The assembly of claim 11 wherein there are two rows of said rollers with each row of rollers being carried by one of said cages.

13. The assembly of claim 11 wherein there is a single row of said rollers and each roller is seated in a pocket of both cages.

14. An overrunning clutch assembly comprising a clutch member having a plurality of circumferentially spaced cam surfaces and stop shoulders adjacent said cam surfaces, a cage assembled with said clutch member in telescoped relation and having pockets aligned with said cam surfaces, and rollers disposed in said pockets and retained between said cage and said clutch member as a unit, said cage being in the form of an end ring having a plurality of axially extending fingers defining said pockets, said fingers being resiliently bendable under a circumferential load, and stop means on said end ring engageable with said stop shoulders to restrict relative circumferential movement between said cage and said clutch member, and the relative position of said cam surfaces, said stop shoulder, said stop means and said fingers being one wherein when said rollers are in operative engagement with said cam surfaces said stop means and said stop shoulders are engaged and said fingers are resiliently bent to urge said rollers into wedging engagement with said cam surfaces.

15. The assembly of claim 14 wherein each finger has a roller supporting seat disposed radially remote from an associated cam surface and in radial alignment with an associated pocket to retain the respective roller therein prior to the assembling of said assembly with machine components.

16. The clutch assembly of claim 14 wherein said rollers are relatively long and there is a cage at each end of said rollers, said cages being mirror images of one another.

17. The clutch assembly of claim 16 wherein there are two rows of said rollers.

18. The clutch assembly of claim 16 wherein there are two rows of said rollers with innermost ones of said cages being in back-to-back relation.

19. The clutch assembly of claim 16 wherein there are two rows of said rollers with innermost ones of said cages being in back-to-back relation and of an integral construction.

20. The clutch assembly of claim 14 wherein there are at least four rows of said rollers with rollers of each row being supported at at least one end thereof by one of said cages.